United States Patent [19]

Nishimagi et al.

[11] Patent Number: 5,688,314
[45] Date of Patent: Nov. 18, 1997

[54] PHOSPHORIC ACID METAL COMPOUND-CONTAINING PEARL PIGMENT

[75] Inventors: Atuko Nishimagi, Iwaki; Masahiko Yazawai, Tokyo-to; Katuhisa Nitta, Iwaki, all of Japan

[73] Assignee: Merck Patent Gesellschaft Mit Beschrankter Haftung, Darmstadt, Germany

[21] Appl. No.: 691,231

[22] Filed: Aug. 2, 1996

[30] Foreign Application Priority Data

Aug. 4, 1995 [JP] Japan .................................. 7-218303

[51] Int. Cl.$^6$ ........................................ C09C 1/36
[52] U.S. Cl. ........................ 106/443; 106/437; 106/446
[58] Field of Search .............................. 106/437, 443, 106/446, 20 R; 523/1

[56] References Cited

U.S. PATENT DOCUMENTS

| | | | |
|---|---|---|---|
| 3,331,699 | 7/1967 | Marshall et al. | 106/291 |
| 5,282,897 | 2/1994 | Bugnon et al. | 106/437 |

Primary Examiner—Deborah Jones
Assistant Examiner—Amy M. Harding
Attorney, Agent, or Firm—Millen, White, Zelano, & Branigan, P.C.

[57] ABSTRACT

A pearl pigment which is excellent in discoloration resistance and in affinity (dispersibility) with resins, a production method for the same, and a resin composition, paint and ink into which the above pearl pigment is incorporated. The pearl pigment comprises a flake substrate, titanium oxide coated on the surface thereof, and a phosphoric acid metal compound, or a phosphoric acid metal compound and a metal oxide coated on the surface of particles coated with titanium oxide.

21 Claims, No Drawings

PHOSPHORIC ACID METAL COMPOUND-CONTAINING PEARL PIGMENT

BACKGROUND OF THE INVENTION

The present invention relates to a novel pearl pigment using a flake substrate as a base material, more specifically to a novel pearl pigment which is excellent in resistance to discoloration caused by light and heat, as well as in affinity (dispersibility) with resins, a production method for the same, and a resin composition, paint and ink into which the above pearl pigment is incorporated.

There are known and widely employed pearl (i.e., pearlescent or "nacreous") pigments in which a flake substrate is coated with metal oxides having high refractive indices, for example, titanium dioxide and zirconium oxide, to cause a pearlescent color to be revealed by an interference color generated by interference due to reflection of light. Also known are pearl pigments in which colored metal oxides, for example, iron oxide and chromium oxide, or colored pigments and dyes are impregnated into this coating layer to cause colored pearlescence to be developed.

Among them, with respect to white-color (including an interference color) pearl pigments, well known is a pearl pigment which is composed of a coating layer using titanium oxide as a base material. Titanium oxide is well known as an optically active material (for example, see Susumu Okazaki, "Coloring Material," 60[6], 333–341 (1987)), and it is reported that when this is mixed into paint and ink and kneaded into plastics, a resin component contacting this titanium oxide deteriorates (chalking; whiting) as time passes with light or heat energy as an initiator (see, for example, Okazaki, above, and Hiroshi Tsubomura, "Optical Electrochemical and Energy Conversion," Tokyo Kagaku Dohjin (1980), p. 198). Further, it is said that when this titanium oxide is kneaded into a plastic comprising polyolefin, titanium oxide reacts with a phenol derivative (for example, BHT and the like) or aniline-derivatives light stabilizer to form a coordination complex or a coordination compound, which causes discoloration (see, for example, D. A. Holzen, "TI-PURE" Technical Report, Du Pont Japan, No. 84-003 (1)). These kind of problems are similarly found when using a pearl pigment in which titanium oxide is coated on the surface thereof.

The present inventors have previously proposed a pearl pigment in which the defects described above are improved and which has a good dispersibility without discoloration and coagulation of the particles (see JP-A-6-16964). This pearl pigment is prepared by using, as a raw material, a white pearl pigment prepared by first coating titanium oxide on mica particles and coating respective metal oxides (or hydrates) of silicon, aluminum and zinc in order on these white titanium oxide-coated mica particles (that is, as an outer layer) by a wet method, wherein it has been intended to reduce the exposure of titanium oxide to light and heat energies coming from the outside with the above outer layer and enhance the dispersibility of the pigment itself. However, this production method requires the repetition of the processing operations of a hydrolytic reaction twice and dry processing (drying and calcination) and is therefore a disadvantageous production method.

On the other hand, when a conventional pearl pigment in which metal oxides using titanium oxide as a base material are coated on a flake substrate is incorporated into a resin system, the pigment often moves to the surface of the resin composition, and this contaminates the surfaces of kneading rolls and calendar rolls in a molding machine to generate a phenomenon called plate out, which causes differences in the quality by product and lot. In order to solve this problem of plate out, a method has been proposed in which blended components for a resin composition are improved (see, for example, JP-A-63-317557), and in addition to this, in case of a pearl pigment, a pigment in which the surface is treated with a specific polymer, such as, for example, a pearl pigment coated directly with a polyester-polyurethane block copolymer having a tertiary amino group (see JP-A-63-46266). However, the use of these pearl pigments has been problematic in that the kind of resins able to be used is restricted.

Further, there has been the problem that when a metal oxide (titanium oxide)-coated flake substrate pigment itself is used as is as a raw material for ink, raising the pigment content in order to emphasize pearlescence particularly in offset printing causes unevenness in printing as the number of printed sheets increases. This is because the affinity (dispersibility) of the pigment for an ink medium is low, and a phenomenon of so-called piling in which a pigment is separated from a medium and piles up on rolls, plate and blanket.

SUMMARY OF THE INVENTION

The present invention is intended to solve the problems that conventional techniques pose. That is, an object of the present invention is to provide a pearl pigment which is improved in discoloration resistance, reduced in plate-out in production, and in which the printing and dispersion characteristics of ink when the pearl pigment is used as mixed in with paint and ink or as incorporated into plastics, are improved. The invention also provides a convenient production method for the same, and resin, paint and ink compositions containing the pearl pigment obtained by the above production method.

It has been found that the discoloration resistance of a pearl pigment, the affinity (dispersibility) thereof with a resin, and a printing aptitude in ink are notably improved by coating titanium oxide and a phosphoric acid metal compound, or titanium oxide, a phosphoric acid metal compound and other metal oxides on the surface of a flake substrate, while the intended pearlescence is maintained.

The present invention preferably provides a novel pearl pigment comprising a flaky (i.e., platelet-shaped) substrate, with titanium oxide coated on the surface thereof, and a phosphoric acid metal compound or a phosphoric acid metal compound and a metal oxide coated on the particles coated with titanium oxide. Metals include Zn, Al, Zr, Mg, Bi, Si, Ti, Ba, Sn and Ca.

The present invention provides a novel pearl pigment in which after preferably coating titanium oxide on the surface of a flaky substrate, a substance is coated thereon:

a) wherein the amount of the phosphoric acid component constituting the phosphoric acid metal compound to be coated is present in a proportion of, e.g. , 0.1 to 5 weight % in terms of $P_2O_5$ based on titanium oxide ($TiO_2$ basis); the metal element constituting the phosphoric acid metal compound and the metal oxide is preferably at least one selected from Zn, Al, Zr, Mg, and Bi; and the amount thereof is preferably present in a proportion of, e.g., 0.5 to 10 weight % in terms of metal oxide based on titanium oxide ($TiO_2$ basis), or b) wherein the amount of the phosphoric acid component constituting the phosphoric acid metal compound to be coated is preferably in a proportion of, e.g., 0.1 to 5 weight % in terms of $P_2O_5$ based on titanium oxide ($TiO_2$ basis); the kinds of metals constituting the phosphoric acid metal compound and the metal oxide are preferably Zn, Al and Si, and the metal compounds thereof are coated in order; and the amounts thereof are preferably present in the proportions of, e.g., 0.5 to 10 weight % in terms of $ZnO_2$ based on titanium oxide ($TiO_2$ basis), 0.5 to 10 weight % in terms of $Al_2O_3$ based on titanium oxide ($TiO_2$ basis), and 0.5 to 5 weight % in terms of $SiO_2$ based on titanium oxide ($TiO_2$ basis), respectively.

Further, the present invention provides:

(1) a method for producing a pearl pigment, comprising:

preparing an aqueous suspension of a flaky substrate, coating titanium oxide hydrate prepared by the hydrolysis of a titanium salt on the surface of the substrate, adding phosphoric acid or a phosphate compound and a salt of at least one metal selected from Zn, Al, Zr, Mg and Bi and then forming the hydrolysis product of the metal salt thereof and the phosphoric acid metal salt thereof with alkali to coat them on a coated particle surface thereof, and filtering and washing the coated particles, followed by drying and calcining them, or (2) a method for producing a pearl pigment, comprising:

preparing an aqueous suspension of a flaky substrate, coating titanium oxide hydrate prepared by the hydrolysis of a titanium salt on the surface of the substrate, adding phosphoric acid or a phosphoric acid salt compound and a Zn salt to a coated particle surface to form the hydrolysis product of the Zn salt and the phosphoric acid metal salt thereof with alkali, then using an Al salt and alkali to form the neutralized hydrolysis product thereof, further adding a silicate compound to form a hydrolysis product thereof, and coating them in order, and filtering and washing the coated particles, followed by drying and calcining them.

Further, the present invention provides a pearl pigment prepared by subjecting the pearl pigment thus obtained to a surface coating treatment with at least one modifying agent selected from a silane coupling agent, an organosiloxane compound, and/or an aliphatic carboxylic acid. In addition, the present invention provides paint, ink and resin compositions into which the pearl pigment of the present invention is blended.

The novel pearl pigment according to the present invention is excellent in discoloration resistance, facility in kneading into resins, and printability when it is used for plastics, paint, and ink as a pearl pigment.

Further, the production method according to the present invention is a very convenient and advantageous method in terms of production management and energy saving since after once preparing a suspension of a flaky substrate, intermediate processes such as drying and calcining in the middle of the process does not have to be carried out, and the reaction and treatment can be consistently carried out in succession in a suspension state (wet).

The flaky substrate used in the present invention includes stratified clay minerals such as mica, kaolin, and talc, flaky oxides of metals selected from titanium, aluminum, silicon, and iron, and glass flakes. In particular, mica which is widely used as a flaky substrate for a pearl pigment is preferably used since it is readily available. The size thereof is preferably from about 2 to 200μ in terms of the average particle diameter and suitably selected within this range according to the applications thereof. For example, when it is used for ink, mica having an average particle diameter of as small as 10μ or less is preferably used. Mica having a thickness of 2μ or less, preferably 1μ or less is suitable for revealing pearlescence.

The amount of titanium oxide coated in the present invention can be optionally in the range of from 15 to 200 weight % (based on the flaky substrate). Since the unit surface area is large when the diameter of a flaky substrate is small, the coated amount is increased, and reversely, since the unit surface area is small when the diameter of a flaky substrate is large, the coated amount is decreased. The optical thickness has to be fundamentally increased when an interference color is revealed, and the coated amount is increased by more than the coated amount in case of a silver color tone. Accordingly, the coated amount of titanium oxide is suitably determined according to an intended color tone, in accordance with conventional procedures known in the art.

With respect to the method for coating titanium oxide hydrate on a flaky substrate according to the present invention, there can be employed known methods, for example, either a method by neutralized hydrolysis in which a titanium salt aqueous solution and an alkali solution are added at the same time while maintained (at about pH 2), or a method using heat hydrolysis in which a titanium salt compound is added in advance and heat is then applied. In this case, a rutilizing agent, for example, a tin salt can be used in order to convert titanium oxide crystal to a rutile type. Titanium tetrachloride, titanium trichloride, and titanyl sulfate are preferably used because of easier availability thereof. This reaction can run simultaneously with coating by the phosphoric acid metal compound.

To coat with the phosphoric acid metal compound (wherein the titanium oxide is desired is a first layer, then after this hydrolytic reaction of coating by titanium oxide hydrate), phosphoric acid or a phosphate compound and a desired metal salt are added to a system of the suspension to form a phosphoric acid metal compound. In this case, phosphoric acid or the phosphate compound includes phosphoric acid, condensed phosphoric acid, and the alkaline metal salts thereof, e.g., phosphoric acid, disodium phosphate, monosodium phosphate, dipotassium phosphate, monopotassium phosphate, potassium pyrophosphate, sodium pyrophosphate, potassium tripolyphosphate, and sodium tripolyphosphate. Phosphoric acid, disodium phosphate, and dipotassium phosphate are preferably used from the viewpoint of easy availability and cost. The amount of this phosphoric acid or phosphate compound is used in a proportion of e.g., 0.1 to 5 weight %, preferably 1 to 4 weight % in terms of $P_2O_5$ based on the amount of titanium oxide in the finished product. An amount less than the above level provides lower effect, and even if the amount is increased more than this level, the degree of an increase in a discoloration resistance effect is small. In this case, if pH increases to more than 3 after adding the phosphate compound, the reaction is preferably carried out after pH is once lowered to 3 or less with acid such as hydrochloric acid in a range in which the metal salt to be added subsequently is not hydrolyzed.

In the method (1) described above, the salt of at least one metal selected from Zn, Al, Zr, Mg, and Bi is used as metal constituting the phosphoric acid metal compound and the metal oxide. The amount of this metal salt is, e.g., 0.5 to 10 weight % (based on $TiO_2$), preferably 1 to 4 weight % in terms of metal oxide. Too small an amount thereof does not provide a sufficient effect, and too large amount causes the coagulation of particles themselves, which in turn causes a loss of pearlescence. The raw materials for these metal elements are suitably selected from chlorides, sulfates, nitrates, and oxychlorides thereof considering the availability thereof.

In the method (2) described above, employed is a method in which in order to improve the discoloration resistance and prevent the particles from coagulating by sintering in the production and calcination, an Al salt and an Si salt are coated in order in the amounts of, e.g., from 0.5 to 10 weight % in terms of $Al_2O_3$ based on titanium oxide (as $TiO_2$), and, e.g., from 0.5 to 5 weight % in terms of $SiO_2$ based on titanium oxide (as $TiO_2$), respectively. The use of this Al salt contributes particularly to a coagulation reduction effect of the product attributable to a sintering prevention action in calcination. The amount of 0.5 weight % or less in terms of the metal oxide ($Al_2O_3$) greatly reduces the effect thereof, and the amount of 10 weight % or more not only does not increase the effect thereof but also causes a reduction in the pearl gloss of the pigment. The more preferred amount of it to be used, though this is influenced by the unit surface area of the flaky substrate, is usually from 1 to 4 weight %. The use of the Si salt improves the discoloration resistance effect, and the preferred amount thereof, though it is still influenced by the unit surface area of the flaky substrate, is from 1 to 3 weight % in terms of the metal oxide ($SiO_2$). A decrease in this amount does not enhance the discoloration resistance effect, and an increase in the amount causes sintering in calcination which leads to coagulation and does not provide a pigment with satisfactory dispersibility, which leads to a reduction in the pearlescence.

As described above, "the phosphoric acid metal compound" and "the phosphoric acid metal compounds and the metal oxide" described in the present invention describe a final product produced by a process in which the hydrolysis products of phosphoric acid or a phosphate compound and various metal salts are adhered on a flaky substrate, dried and calcined. Although not wishing to be restricted to a particular physical description, it is considered that these products exist in the state that they are composed of a phosphoric acid metal salt, the mixture of a phosphoric acid metal salt and a metal oxide, the mixture of $P_2O_5$ and other metal oxides, and the composite of $P_2O_5$ and other metal oxides according to the ratio of the amounts of phosphoric acid (or a phosphate compound) to the metal salt used. During the calcination, some phosphoric acid metal salts decompose (for example, $BiPO_4$, $NaHPO_4$, $BaHPO_4$) and some salts (for example $Mg_3(PO_4)_2$) fuse and are convened into the glass state. Phosphoric acid metal salts may be of the formula $Zn_3(PO_4)_2$, $AlPO_4$, $Zr_3(PO_4)_2$, $Mg_3(PO_4)_2$, $BiPO_4$, $Ti_3(PO_4)_4$, $Zn_2P_2O_7$, $Al_4(P_2O_7)_3$, $Ba_2P_2O_7$, $Mg_2P_2O_7$, $TiP_2O_7$, $SnP_2O_7$, and $Ca_2P_2O_7$.

Exemplary production methods according to the present invention will be explained in more detail.

The first production method (the production method (1) described above):

The first step: coating titanium oxide hydrate

A suspension prepared by dispersing a flaky substrate having a desired particle size in water is heated to 70° C. or higher, and an aqueous solution of a titanium salt in which the concentration is adjusted is added to this suspension to adjust the pH to about 2. Further, the aqueous solution of the titanium salt is subsequently added under stirring together with an alkali solution while maintaining the pH at the above level. After adding the prescribed amount, the suspension is further stirred for about 10 minutes.

The second step: adding phosphoric acid or a phosphate compound and a metal salt and coating the hydrolysis products thereof:

Further added in order are phosphoric acid or a phosphate compound in an amount corresponding to from 0.1 to 5 weight % in terms of $P_2O_5$ based on the amount of titanium oxide calculated from the amount of the titanium compound added in the first step, and at least one metal salt of Zn, Al, Zr, Mg or Bi in an amount corresponding to from 0.5 to 10 weight % in terms of the metal oxide thereof based on the amount of the titanium oxide calculated above, wherein stirring is carried out for about 10 minutes without specifically controlling the pH. In the case where the phosphate compound used in this step is, for example, disodium phosphate or sodium tripolyphosphate, the pH increases to some extent. When the pH increases to 3 or higher, it is once lowered to 3 or lower with mineral acids such as hydrochloric acid. Then, an alkali solution is gradually dropped to this suspension to raise the pH up to 7.0.

Third step: after-treatment step

The suspension obtained in the second step is filtered, and soluble free salts are removed by washing with water. After drying, the pigment thus obtained is calcined at from 700° to 1200° C. to thereby obtain the intended pearl pigment.

Second production method (the production method (2) described above):

The second step in the first production method is changed to the following operation.

Added are phosphoric acid or a phosphate compound in an amount corresponding to from 0.1 to 5 weight % in terms of $P_2O_5$ based on the amount of titanium oxide calculated from the amount of the titanium salt added in the first step, and a Zn salt in an amount corresponding to 0.5 to 10 weight % in terms of the oxide thereof based on the amount of titanium oxide calculated above, wherein stirring is carried out for about 10 minutes without specifically controlling the pH. In the case where the phosphate compound used in this step is, for example, disodium phosphate or sodium tripolyphosphate, the pH increases to some extent. When the pH increases to 3 or higher, it is once lowered to 3 or lower with mineral acids such as hydrochloric acid. Then, an alkali solution is gradually added dropwise to this suspension to raise the pH up to 5.5. An Al metal compound aqueous solution is added in an amount corresponding to from 0.5 to 10 weight % in terms of $Al_2O_3$ based on the amount of titanium oxide simultaneously with the alkali solution while maintaining the pH at 5.5. Then, an aqueous solution of a silicate compound is gradually added in an amount corresponding to from 0.5 to 5 weight % in terms of $SiO_2$ based on the amount of titanium oxide without controlling the pH. After completing the addition, stirring is further carried out for 10 minutes.

Thereafter, the treatment in the third step of the first production method described above is carried out to thereby obtain the intended pearl pigment.

The present invention further includes pigments obtained by subjecting the pearl pigments obtained through the respective third steps described above to a surface treatment with surface treating agents such as a silane coupling agent, an organosiloxane compound and aliphatic carboxylic acid. These surface treatments increase both the affinity for resins and a discoloration resistance. In this case, alkyl trimethoxysilanes having an aliphatic chain with 8 or more carbon atoms are preferably used as the silane coupling agent. Also, methyl hydrogenpolysiloxane is preferably used as organosiloxane. Employed as the method for these surface treatments used in the present invention are a method in which the pearl pigment obtained through the third step in the first production method or the second production method is charged into a stirring mixer such as a Henshell mixer and a high-speed blender mixer manufactured by Worling Co., Ltd. and mixed with a surface treating agent added while stirring, or a method in which the components are charged in one lot and mixed, wherein employed is such a means that a heat treatment is provided through stirring according to necessity or a surface treating agent is mixed in advance into an organic solvent and added, followed by heating to remove the solvent.

Without further elaboration, it is believed that one skilled in the art can, using the preceding description, utilize the present invention to its fullest extent. The following preferred specific embodiments are, therefore, to be construed as merely illustrative, and not limitative of the remainder of the disclosure in any way whatsoever.

In the foregoing and in the following examples, all temperatures are set forth uncorrected in degrees Celsius and unless otherwise indicated, all pans and percentages are by weight.

The entire disclosure of all applications, patents and publications, cited above and below, and of corresponding Japanese application 7-218303, filed Aug. 4, 1995, are hereby incorporated by reference.

EXAMPLES

Example 1

(a-1) Muscovite (particle diameter: from about 10 to 60 μm) in an amount of 80 g was suspended in demineralized water of 1 liter, and the suspension was heated to 75° C. while stirring. A titanium tetrachloride aqueous solution in which titanium tetrachloride of 414 g per liter was dissolved was added to this suspension, and the pH was adjusted to 2.2, followed by maintaining it for 5 minutes. Then, the titanium tetrachloride aqueous solution described above was further added dropwise gradually while maintaining the pH at 2.2 with a 32% sodium hydroxide aqueous solution. The titanium tetrachloride aqueous solution of 188 ml was added in total, whereby a suspension of titanium hydroxide-coated mica having a gloss of a silver color was obtained.

(b-1) 85% phosphoric acid of 1.1 g and zinc chloride of 2.0 g were added to the suspension thus obtained and maintained for 10 minutes while stirring. Then, a 32% sodium hydroxide aqueous solution was slowly added dropwise to adjust the pH to 7.0.

(c-1) Further, the coated pigment was filtered off from this suspension, and after washing with demineralized water and drying, the pigment was calcined at 900° C., whereby a pearl pigment having a gloss of a silver color was obtained.

Example 2

A pearl pigment having a gloss of a silver color was obtained in the same manner as that described in Example 1, except that disodium hydrogenphosphate 12 hydrate in an amount of 3.5 g was substituted for phosphoric acid used in the step (b-1) of Example 1, wherein the pH increased to some extent but was maintained as it was for about 10 minutes while stirring, and the pH was then adjusted to 2.2 with a hydrochloric acid aqueous solution, followed by adding zinc chloride ($ZnCl_2$ powder) of 2.0 g.

Example 3

A pearl pigment was obtained in the same manner as that described in Example 1, except that 2.4 g of aluminum chloride 6 hydrate were substituted for zinc chloride used in the step (b-1) of Example 1.

Example 4

A pearl pigment was obtained in the same manner as that described in Example 1, except that magnesium chloride 6 hydrate in an amount of 3.0 g was substituted for zinc chloride used in the step (b-1) of Example 1.

Example 5

A pearl pigment was obtained in the same manner as that described in Example 1, except that the operation was carried out in which after dropwise adding an aqueous solution prepared by diluting a zirconium oxychloride aqueous solution (content 20% as $ZrO_2$) with demineralized water to 60 g for about 20 minutes in place of zinc chloride used in the step (b-1) of Example 1, the suspension was maintained for 10 minutes while stirring, and a sodium hydroxide aqueous solution was then added slowly to adjust the pH value to 7.

Example 6

After the step (a-1) in Example 1, the final pH in the operation of the step (b-1) was adjusted to 5.5, and subsequently, a 6% aluminum chloride 6 hydrate aqueous solution of 94.8 g was dropped for 30 minutes while maintaining the pH at 5.5 with a sodium hydroxide aqueous solution. Then, further added was the step in which a sodium silicate ($SiO_2$: 36%) solution of 1.67 g was diluted with water to 11.1 g, and this solution was added dropwise thereto for about 10 minutes. The operation of (c-1) in Example 1 was then carried out, whereby a pearl pigment having a gloss of a silver color was obtained.

Example 7

(a-2) Muscovite (particle diameter: from about 5 to 20 μm) in an amount of 60 g was suspended in demineralized water of 1 liter, and the suspension was heated to 75° C. while stirring. A titanium tetrachloride aqueous solution in which 414 g per liter of titanium tetrachloride were dissolved was added to this suspension, and the pH was adjusted to 2.2, followed by maintaining it for 5 minutes. Then, the titanium tetrachloride aqueous solution described above was further dropwise added gradually while maintaining the pH at 2.2 with a 32% sodium hydroxide aqueous solution. The titanium tetrachloride aqueous solution of 211 ml was added in total, whereby a suspension of titanium hydroxide-coated mica having a gloss of a silver color was obtained.

(b-2) 85% phosphoric acid in an amount of 1.3 g and zinc chloride of 2.3 g were added to the suspension thus obtained and maintained for 10 minutes while stirring. Then, a 32% sodium hydroxide aqueous solution was slowly added dropwise to adjust the pH to 5.5. Next, a 6% aluminum chloride 6 hydrate aqueous solution of 124 g was added dropwise thereto for about 30 minutes while maintaining the pH at 5.5. Then, an aqueous solution prepared by diluting a sodium silicate ($SiO_2$: 36%) of 2.2 g with water to 14.7 g was added dropwise for about 10 minutes and maintained for about 10 minutes.

(c-2) Further, the pigment was filtered off from this suspension, and after washing with demineralized water and drying, the pigment was calcined at 930° C., whereby a pearl pigment having a gloss of a silver color was obtained.

Example 8

(a-3) Muscovite (particle diameter: from about 5 to 20 μm) in an amount of 60 g was suspended in demineralized water of 1 liter, and the suspension was heated to 75° C. while stirring. An aqueous solution of 22.6 ml in which tin tetrachloride 5 hydrate in an amount of 414 g per liter was dissolved as a rutilizing agent was prepared, and this aqueous solution was gradually added dropwise while maintaining the pH at 2.0 with a 32% sodium hydroxide aqueous solution. After maintaining for 15 minutes while stirring, a solution containing titanium tetrachloride in an amount of 414 g per liter was gradually added dropwise while maintaining the pH at 2.0 with a 32% sodium hydroxide aqueous solution. The titanium tetrachloride aqueous solution of 220 ml was added, whereby a suspension of titanium hydroxide-coated mica having a gloss of a silver color was obtained.

(b-3) 85% phosphoric acid in an amount of 1.3 g and zinc chloride in an amount of 2.3 g were added to the suspension thus obtained and maintained for 10 minutes while stirring. Then, a 32% sodium hydroxide aqueous solution was slowly added dropwise to adjust the pH to 5.5. Next, 127 g of a 6% aluminum chloride 6 hydrate aqueous solution were added dropwise for about 30 minutes while maintaining the pH at 5.5. Then, an aqueous solution prepared by diluting 2.2 g of a sodium silicate ($SiO_{2:36}$%) with water to 14.7 g was added dropwise for about 10 minutes and maintained for about 10 minutes.

(c-3) Then, the same operation as that in the step (c-2) of Example 7 was carried out, whereby a pearl pigment was obtained.

Comparative Example 1

After carrying out the same operation as that in the step (a-1) of Example 1, the operation of the step (c-1) in Example 1 was carried out to thereby obtain a titanium oxide-coated pigment.

Comparative Example 2

After carrying out the same operation as that in the step (a-2) of Example 7, the operation of the step (c-2) in Example 7 was carried out to thereby obtain a titanium oxide-coated pigment.

Comparative Example 3

After carrying out the same operation as that in the step (a-3) of Example 8, the operation of the step (c-2) in Example 7 was carried out to thereby obtain a rutile-type titanium oxide-coated pigment.

Example 9

(a-4) Muscovite (particle diameter: from about 2 to 8 μm) in an amount of 140 g was suspended in demineralized water of 1.75 liter, and the suspension was heated to 75 ° C. while stirring. A titanium tetrachloride aqueous solution in which titanium tetrachloride in an amount of 414 g per liter was dissolved was added to this suspension, and the pH was adjusted to 2.2, followed by maintaining it for 5 minutes. Then, the titanium tetrachloride aqueous solution described above was further added dropwise gradually while maintaining the pH at 2.2 with a 32% sodium hydroxide aqueous solution. The titanium tetrachloride aqueous solution in an amount of 810 ml was added in total, whereby a suspension of titanium hydroxide-coated mica having a gloss of a silver color was obtained.

(b-4) 85% phosphoric acid in an amount of 5.2 g and zinc chloride in an amount of 9.2 g were added to the suspension thus obtained and maintained for 10 minutes while stirring. Then, a 32% sodium hydroxide aqueous solution was slowly added dropwise to adjust the pH to 5.5.

(c-4) Further, the pigment was filtered off from this suspension, and after washing with demineralized water and drying, the pigment was calcined at 880° C., whereby a pearl pigment having a gloss of a silver color was obtained.

Example 10

A pearl pigment having a gloss of a silver color was obtained in the same manner as that described in Example 9, except that aluminum chloride was substituted for zinc chloride used in the step (b-4) of Example 9 and that 8.2 g of 85% phosphoric acid and 17.2 g of aluminum chloride 6 hydrate were used.

Example 11

(a-5) Muscovite (particle diameter: from about 2 to 8 μm) in an amount of 140 g was suspended in demineralized water of 1.75 liter, and the suspension was heated to 75° C. while stirring. A titanium tetrachloride aqueous solution in which titanium tetrachloride in an amount of 414 g per liter was dissolved was added to this suspension, and the pH was adjusted to 2.2, followed by maintaining it for 5 minutes while stirring. Then, the titanium tetrachloride aqueous solution described above was further added dropwise gradually while maintaining the pH at 2.2 with a 32% sodium hydroxide aqueous solution. The titanium tetrachloride aqueous solution in an amount of 810 ml was added in total, whereby a suspension of titanium hydroxide-coated mica having a gloss of a silver color was obtained.

(b-5) A 3.8% bismuth nitrate 5 hydrate aqueous solution diluted with nitric acid in an amount of 241 g was added to the suspension thus obtained and maintained for 5 minutes while stirring. Then, a 8.5% phosphoric acid aqueous solution was slowly added dropwise to adjust the pH to 5.5.

(c-5) Further, the pigment was filtered off from this suspension, and after washing with demineralized water and drying, 55 g of the pigment was measured and placed into a porcelain crucible (volume: 250 ml), and then calcined at 880° C. for 20 minutes, whereby a pearl pigment having a gloss of a silver color was obtained.

Comparative Example 4

After carrying out the same operation as that in the step (a-4) of Example 9, the operation of the step (c-4) in Example 9 was carried out to thereby obtain a titanium oxide-coated pigment.

Comparative Example 5

Only 85% phosphoric acid was used in the step (b-4) of Example 9, whereby a titanium oxide-coated pigment was obtained in the same manner as that described in Example 9.

Example 12

The pearl pigment of 98 g obtained in Example 6 and SH1107 (manufactured by Toray Dow Corning Co., Ltd.) of 2 g as the organosiloxane compound were put into a mixer (high speed blender mixer manufactured by Worling Co., Ltd.) having a volume of 1200 ml and mixed by stirring. Further, the suspension was subjected to a heat treatment at 130° C., whereby a surface-treated pearl pigment having a good powder fluidity was obtained.

Example 13

The pearl pigment in an amount of 98 g obtained in Example 6 and stearic acid of 2 g were put into the mixer (high speed blender mixer manufactured by Worling Co., Ltd.) having a volume of 1200 ml and mixed by stirring while heating at 70° C., whereby a surface-treated pearl pigment having a good powder fluidity was obtained.

Discoloration resistance test:

(1) Evaluation with n-propyl gallate n-Propyl gallate which is a kind of a phenol derivatives stabilizer discolored by contact with titanium oxide was used for evaluating discoloring property to compare and evaluate the pigments of the present invention described in the examples and the pigments described in the comparative examples.

[Preparation of test samples]

A: The pigments in an amount of each 1 g obtained in the examples and the comparative examples and an ink medium (VS Medium manufactured by Dainichi Seika Co., Ltd.) in an amount of 9 g were put into a beaker and mixed sufficiently to homogeneity by stirring.

B: The pigments in an amount of each 1 g obtained in the examples and the comparative examples and an ink medium (VS Medium manufactured by Dainichi Seika Co., Ltd.) in an amount of 9 g containing n-propyl gallate (Extra Pure manufactured by Kanto Chemical Co., Ltd.) in a proportion of 1% were put into a beaker and mixed sufficiently to homogeneity by stirring.

[Test method]

The samples of A and B were coated on a black and white masking test paper with a bar coater No. 20. After drying, these two b values (yellow) were measured with a color meter (CR-200 manufactured by Minolta Camera Co., Ltd.). The difference $\Delta$b value (the b value of the sample B–the b value of the sample A) between these b values were then calculated. The results thereof are shown in Table 1.

TABLE 1

| Sample | $\Delta$b |
|---|---|
| Example 1 | +0.2 |
| Example 2 | +0.8 |
| Example 3 | +0.6 |
| Example 4 | +0.6 |
| Example 5 | +0.7 |
| Example 6 | +0.3 |
| Example 7 | +0.4 |
| Example 8 | +0.3 |
| Comp. Example 1 | +5.9 |
| Comp. Example 2 | +6.7 |
| Comp. Example 3 | +4.8 |

As shown in Table 1, it has been observed that all of the pigments according to the present invention have small $\Delta$b values and therefore excellent discoloration resistance.

(2) Evaluation by black lamp

The light resistance was evaluated with a black lamp having its main light source in the ultraviolet region.

[Preparation of test pieces]

A sample pigment of 1 g and an anti-oxidation agent (BHT, Yoshinox manufactured by Yoshitomi Pharmaceutical Co., Ltd.) of 0.1 g were added to the substance prepared by blending HDPE (Hizex 2100J manufactured by Mitsui Petro-chemical Co., Ltd.) of 98.8 g with a wetting agent (liquid paraffin, Hi-White manufactured by Nippon Petroleum Co., Ltd.), and mixed well. This mixture was molded by injection to prepare a test piece with a height of 14.8 cm, a width of 7.5 cm and a thickness of 0.2 cm.

[Evaluating method]

A light cabinet equipped with one black lamp (20 W, manufactured by Nippo Co., Ltd.) with emission in the ultraviolet region as a light source was prepared, and the test piece described above, which was separated by 20 cm from the light source, was left irradiated at room temperatures for 2 weeks. The b values were measured with a color-difference meter before and after the irradiation, and the difference thereof was calculated in terms of the $\Delta$b value. The results thereof are shown in Table 2.

TABLE 2

| Sample | $\Delta$b |
|---|---|
| Example 2 | +1.7 |
| Example 6 | +0.7 |
| Example 7 | +0.7 |
| Example 8 | +1.1 |
| Iriodin 100 | +5.1* |
| Iriodin 120 | +5.4* |

*manufactured by Merck Japan Co., Ltd.

As apparent from the results summarized in Table 2, it has been observed that the pearl pigments of the present invention have small $\Delta$b values and therefore excellent discoloration resistance as compared with Iriodin 100 (Pearl pigment composed of 29 wt. % titanium dioxide coated on mica with particle size of from 10 to 60µ) and Iriodin 120 (Pearl pigment composed of 38 wt. % titanium dioxide coated mica with particle size of from 5 to 20µ).

(3) Evaluation by light irradiation and bedewing cycle

Cycle test using by UV rays and bedewing (wetting) was carried out.

[Preparation of test pieces]

Test pieces were prepared in the same manner as that described above, except that Hizex 6200B (manufactured by Mitsui Petrochemical Co., Ltd. ) was substituted for HDPE (Hizex 2100J).

[Evaluating method]

A cycle test of irradiating and bedewing was carried out with a weather meter (dew panel light control weather meter manufactured by Suga Testing Machine Co., Ltd.) using a UV ray fluorescent lamp as a light source, wherein the test piece was set and exposed for 200 hours; and the b values before and after the exposure were measured with a color meter to calculate the $\Delta$b values. The results thereof are shown in Table 3.

TABLE 3

| Sample | $\Delta$b |
|---|---|
| Example 6 | +2.3 |
| Example 7 | +2.6 |
| Example 8 | +1.0 |
| Iriodin 100 | +5.3 |
| Iriodin 120 | +6.7 |

It is observed from the results summarized in Table 3 that all of the pigments according to the present invention have low levels of discoloration.

(4) Exposure evaluation in an ammonia gas atmosphere

The test pieces were irradiated with a fluorescent lamp in an ammonia gas atmosphere in order to evaluate them.

[Preparation of test pieces]

HDPE (Hizex 2100J manufactured by Mitsui Petrochemical Co., Ltd.) in an amount of 980 g and the pigment of 20 g were charged into a Henshell mixer and mixed thoroughly. This mixture was molded by injection to prepare test pieces in the same manner as described above.

[Evaluating method]

The test pieces were set and tightly closed in a desiccator (diameter of the middle plate: 210 mm) into which 500 ml of 28% aqueous ammonia were placed. A lamp was adjusted so that the illuminance on the surface of the test pieces became 2000 lux, and the test pieces were irradiated with a fluorescent lamp at room temperature for 100 hours. The b values before and after the irradiation were measured with a color meter to calculate the Δb values. The results thereof are shown in Table 4.

TABLE 4

| Sample | Δb |
|---|---|
| Example 7 | +1.0 |
| Example 8 | +1.0 |
| Iriodin 100 | +5.4 |
| Iriodin 120 | +7.8 |

It has been observed from the results summarized in Table 4 that all of the pigments according to the present invention have low levels of discoloration.

Offset printing test:

An offset priming aptitude was evaluated according to the following method.

[Preparation of ink]

A pearl pigment of 36 g was added to an ink medium (TK Mark 5, new ultra-glossy medium M; manufactured by Toyo Ink Co., Ltd.) of 64 g, and this mixture was kneaded with three rolls (NS-400B) manufactured by Kodaira Seisakusho Co., Ltd. to homogeneity, whereby ink for evaluation was prepared.

[Evaluation of pigment transferability]

An ink in an amount of 0.4 ml for evaluation was put on the three points of a rubber roll of an RI tester (RI-2) manufactured by Akira Seisakusho Co., Ltd., and then the ink was kneaded for 3 minutes. A blanket on which an art paper for transferring a pigment was fixes was rotated by one revolution at a speed of 100 revolutions per minute to transfer the pigment put on the rubber roll thereon. The surface of the art paper was photographed with a metallurgical microscope, and the area occupied by the pigment in a unit area was measured from the photograph. The pigment-transferred amount is defined by this occupying area, and it is judged that the larger this value is, the more excellent the pigment transferability is. Further, observed were the metal of the RI tester after transferring the pigment thereon and the presence of piling on the rubber roll. The pigment in which piling is not found is judged to have a high affinity (dispersibility) for the ink medium. The results thereof are shown in Table 5.

TABLE 5

| Sample | Pigment transfer amount (cm²) | Piling |
|---|---|---|
| Example 9 | 114 | None |
| Example 10 | 108 | None |
| Example 11 | 102 | None |
| Comp. Example 4 | 88 | Present |
| Comp. Example 5 | 90 | None |

It is observed from the results summarized in Table 5 that the pigments according to the present invention have large pigment-transfer amounts and no piling and is excellent in an offset printing aptitude as compared with the pigments of the comparative examples.

The pigments obtained in Example 9 and Example 10 were evaluated in terms of the offset printing aptitude with a commercial offset printing machine (Ryobi: 3302M) manufactured by Ryobi Co., Ltd. As a result thereof, it has been confirmed that piling has not occurred.

Evaluation test for a plate out resistance:

The plate-out of a pigment which is problematic when it is incorporated into plastics and processing was evaluated according to the following method.

[Preparation of test samples]

A compound prepared by blending a pigment of 5 parts with a soft polyvinyl chloride compound (containing DOP of 80 parts per 100 parts of PVC) in an amount of 100 parts was kneaded for 3 minutes with two rolls heated to 150° C. A sheet wound round the roll was removed, and the soft polyvinyl chloride compound was further kneaded at the same temperature for 3 minutes. The pigment (plate out pigment) adhered on the surface of the roll was removed and processed into a sheet with a thickness of about 1.5 mm. This sheet was separated from a roll face and processed again into a sheet with a thickness of 0.5 mm in the press conditions of 170° C. and 20 kg/cm², whereby a sample for evaluation was prepared.

[Evaluation of plate-out property]

The number of pigments distributed at optional 12 points in the sample prepared for evaluation was counted under a metallurgical microscope at a magnification of 100, and a plate-out amount was defined by an average of the number. The smaller this value is, the more excellent the plate out resistance is. The results thereof are shown in Table 6.

TABLE 6

| Sample | Plate out amount |
|---|---|
| Example 6 | 122 |
| Example 12 | 39 |
| Example 13 | 102 |
| Comp. Example 1 | 338 |

It has been observed from the results summarized in Table 6 that all of the pigments according to the present invention have small plate out amounts and are therefore excellent in plate-out resistance.

The preceding examples can be repeated with similar success by substituting the generically or specifically described reactants and/or operating conditions of this invention for those used in the preceding examples.

From the foregoing description, one skilled in the art can easily ascertain the essential characteristics of this invention, and without departing from the spirit and scope thereof, can make various changes and modifications of the invention to adapt it to various usages and conditions.

What is claimed is:

1. A pearlescent pigment comprising a flaky substrate having thereon a titanium oxide and a phosphoric acid metal compound.

2. A pearlescent pigment according to claim 1, wherein the phosphoric acid metal compound is a compound of at least one of Zn, Al, Zr, Mg, Bi, Si, Ti, Ba, Sn or Ca.

3. A pearlescent pigment according to claim 1 comprising a flaky substrate having thereon a titanium oxide and (a) at least one metal salt of phosphoric acid, (b) at least one metal salt of phosphoric acid and an oxide of the same metal or metals, (c) phosphorous pentoxide and at least one oxide of Zn, Al, Zr, Mg or Bi, or (d) a mixture of at least two of (a), (b) or (c).

4. A pearlescent pigment according to claim 3, comprising a flaky substrate having thereon a titanium oxide and (a) at least one Zn, Al, Zr, Mg or Bi salt of phosphoric acid, (b) at least one Zn, Al, Zr, Mg or Bi salt of phosphoric acid and an oxide of the same metal or metals, or (c) a mixture thereof.

5. A pearlescent pigment according to claim 3, wherein a titanium oxide is present on the substrate as a first layer.

6. A pearlescent pigment according to claim 3, wherein the substrate is mica, kaolin, talc, a titanium oxide, an aluminum oxide, an iron oxide or glass flakes.

7. A pearlescent pigment according to claim 6, wherein the substrate has an average particle diameter of 2 to 200 μm.

8. A pearlescent pigment according to claim 3, wherein titanium oxide in an amount of 15 to 200% by weight based on the substrate is used.

9. A pearlescent pigment according to claim 3, which is surface coated with at least one silane coupling agent, at least one organosiloxane compound, at least one aliphatic carboxylic acid, or a mixture thereof.

10. A pearlescent pigment according to claim 1 comprising titanium oxide, a Zn salt of phosphoric acid and optionally a zinc oxide, an Al salt of phosphoric acid and optionally an Al oxide, and a Si salt of phosphoric acid and optionally an Si oxide.

11. A pearlescent pigment according to claim 10, comprising successive layers of titanium oxide, Zn salt, Al salt and Si salt.

12. A pearlescent pigment according to claim 1, comprising 0.1 to 5% by weight of phosphoric acid metal compound expressed as $P_2O_5$, based on titanium oxide, and the phosphoric acid metal compound is a compound of at least one of Zn, Al, Zr, Mg or Bi in an amount of 0.5 to 10g by weight expressed as metal oxide, based on titanium oxide.

13. A pearlescent pigment according to claim 1, comprising 0.1 to 5% by weight of phosphoric acid metal compound expressed as $P_2O_5$, based on titanium oxide, and the phosphoric acid metal compound is a compound of Zn, Al and Si in an amount of 0.5 to 10% by weight $ZnO_2$, 0.5 to 10% by weight $Al_2O_3$ and 0.5 to 5% by weight $SiO_2$, each based on titanium oxide.

14. A pearlescent pigment according to claim 1, wherein the phosphoric acid metal compound is a compound of at least one of Zn, Mg, Bi, Ba or Ca.

15. A method for producing a pearlescent pigment comprising a flaky substrate having thereon a titanium oxide and (a) at least one metal salt of a phosphoric acid, (b) at least one metal salt of phosphoric acid and an oxide of the same metal or metals, (c) phosphorus pentoxide and at least one oxide of Zn, Al, Zr, Mg, Bi, or (d) a mixture of at least two of (a), (b) or (c), said method comprising:

coating titanium oxide hydrate on an aqueous suspension of a flaky substrate by hydrolysis of a titanium salt on the surface of the substrate, and simultaneously or successively with coating of the substrate forming a hydrolysis product of a salt of at least one Zn, Al, Zr, Mg or Bi metal and phosphoric acid or a phosphate compound with alkali on the substrate surface, and optionally filtrating and washing the coated substrate, followed by drying and calcining.

16. A method for producing a pearl pigment comprising a flaky substrate having thereon a titanium oxide and a Zn salt of phosphoric acid and optionally a zinc oxide, an Al salt of phosphoric acid and optionally an Al oxide, and a Si salt of phosphoric acid and optionally an Si oxide, said method comprising:

coating titanium oxide hydrate on an aqueous suspension of a flaky substrate by hydrolysis of a titanium salt on the surface of the substrate, adding (1) phosphoric acid or a phosphoric acid salt compound and (2) a Zn salt to a coated particle surface and forming a hydrolysis product of the Zn salt and the phosphoric acid metal salt thereof with alkali, adding an Al salt and alkali to form a neutralized hydrolysis product thereof, further adding a silicate compound to form a hydrolysis product thereof, and optionally filtrating and washing the coated particles, followed by drying and calcining.

17. A pearlescent pigment comprising a flaky substrate having thereon a titanium oxide and a phosphoric acid metal compound, said pigment produced by a process comprising:

coating titanium oxide hydrate on an aqueous suspension of a flaky substrate by hydrolysis of a titanium salt on the surface of the substrate, and simultaneously or successively with coating of the substrate forming a hydrolysis product of a salt of at least one Zn, Al, Zr, Mg or Bi metal and phosphoric acid or a phosphate compound with alkali on the substrate surface, and optionally filtrating and washing the coated substrate, followed by drying and calcining.

18. A pearlescent pigment comprising a flaky substrate having thereon a titanium oxide and a phosphoric acid metal compound, said pigment produced by a process comprising:

coating titanium oxide hydrate on an aqueous suspension of a flaky substrate by hydrolysis of a titanium salt on the surface of the substrate, adding (1) phosphoric acid or a phosphoric acid salt compound and (2) a Zn salt to a coated particle surface and forming a hydrolysis product of the Zn salt and the phosphoric acid metal salt thereof with alkali, adding an Al salt and alkali to form a neutralized hydrolysis product thereof, further adding a silicate compound to form a hydrolysis product thereof, and optionally filtrating and washing the coated particles, followed by drying and calcining.

19. A resin composition, paint, or ink comprising a pearlescent pigment comprising a flaky substrate having thereon a titanium oxide and a phosphoric acid metal compound.

20. A resin composition, paint, or ink comprising a pearlescent pigment comprising a flaky substrate having thereon a titanium oxide and (a) at least one metal salt of a phosphoric acid, (b) at least one metal salt of phosphoric acid and an oxide of the same metal or metals, (c) phosphorus pentoxide and at least one oxide of Zn, Al, Zr, Mg, Bi, or (d) a mixture of at least two of (a), (b) or (c).

21. A resin composition, paint, or ink comprising a pearlescent pigment comprising a flaky substrate having thereon a titanium oxide and a Zn salt of phosphoric acid and optionally a zinc oxide, an Al salt of phosphoric acid and optionally an Al oxide, and a Si salt of phosphoric acid and optionally an Si oxide.

* * * * *